April 10, 1951  J. L. SAULSBERRY  2,548,071
FAUCET
Filed June 19, 1946  2 Sheets-Sheet 1
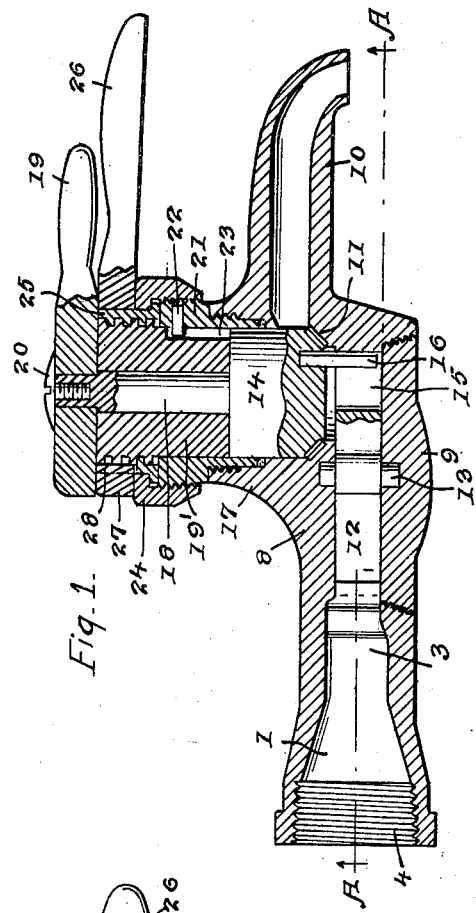
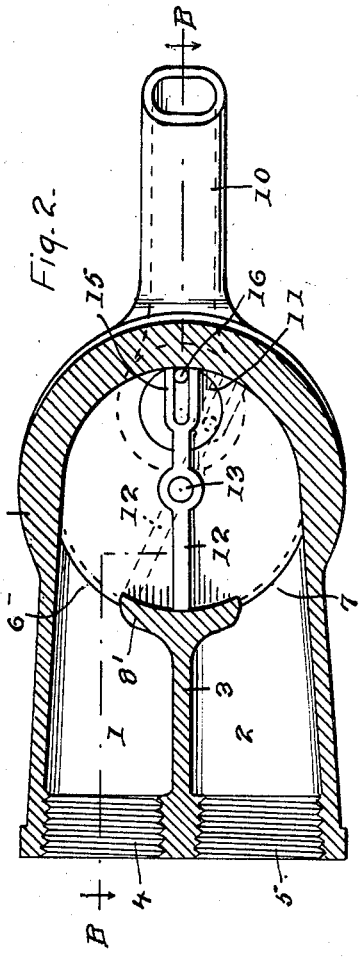
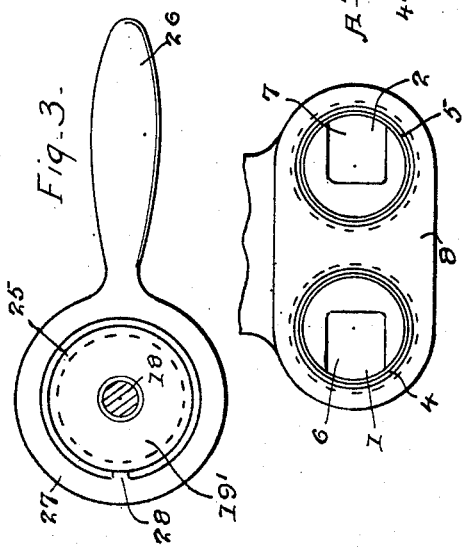
INVENTOR.
JAY L. SAULSBERRY
BY *Victor J. Evans & Co.*
ATTORNEYS April 10, 1951 J. L. SAULSBERRY 2,548,071
FAUCET
Filed June 19, 1946 2 Sheets-Sheet 2
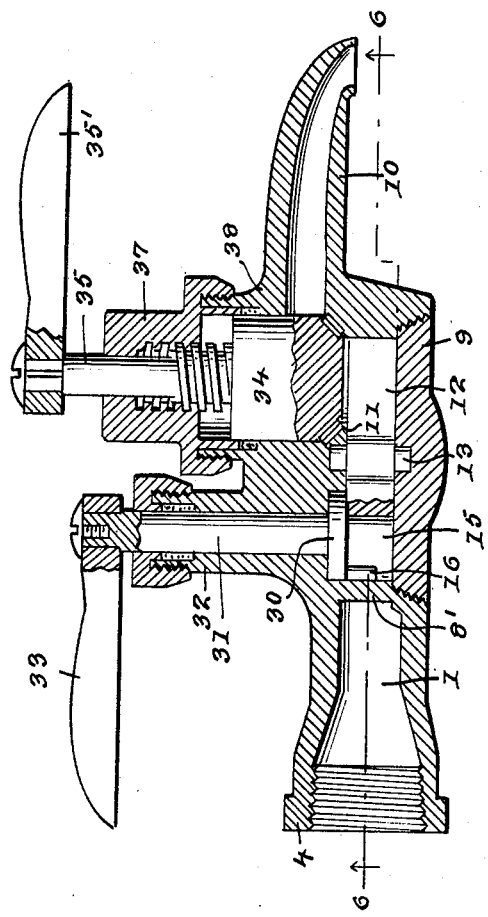
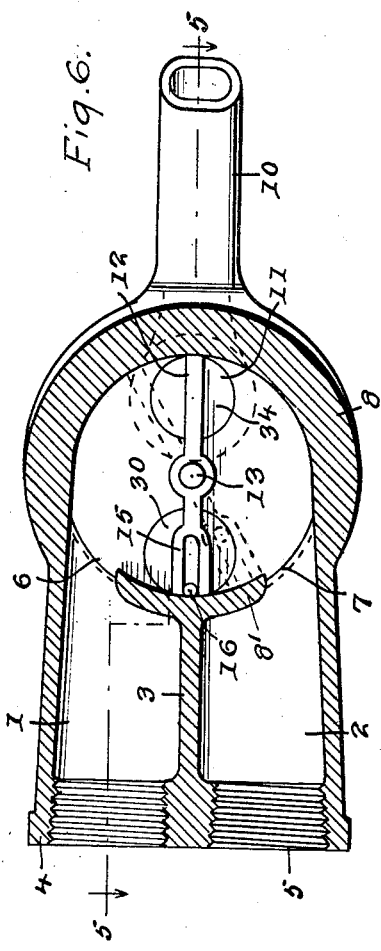
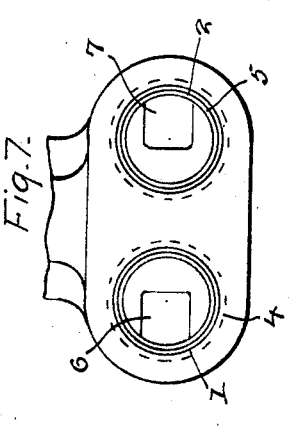
INVENTOR.
JAY L. SAULSBERRY
BY Victor J. Evans & Co.
ATTORNEYS Patented Apr. 10, 1951

2,548,071

UNITED STATES PATENT OFFICE 2,548,071

FAUCET

Jay L. Saulsberry, Tucumcari, N. Mex.

Application June 19, 1946, Serial No. 677,748

3 Claims. (Cl. 277—10)

My present invention relates to improvements in faucets of the constant temperature type utilizing a combined reciprocable and rotary valve or screw actuated plug, and an oscillatible valve device, for controlling the volume and the temperature of the water passing through and dispensed by the faucet.

By the combination and compact arrangement of the volume control plug-valve, with a pivoted-vane temperature control or mixing valve, in a single casing, these valves are readily accessible for operation to provide a cold water supply, a hot water supply, and a mixture of hot and cold water in varying degrees of temperature as well as in a constant flow; and the desired supply may be selected and manually controlled as it is dispensed from the faucet.

While the faucet of my invention is adapted for use with various fluids or liquids, it is especially applicable for domestic uses with sinks, wash-bowls, bath tubs, shower baths, and other plumbing fixtures, where this type of faucet is desirable.

The primary object of the invention is the provision of a faucet of this type that is simple in construction and operation, and which may be manipulated in such manner as to dispense the selected and desired volume and temperature of water without waste, but with efficiency and economy.

In carrying out my invention I utilize a casing having a plurality of water inlets and a valve device for selected control of these inlets, a single outlet and its volume-control valve, and an intermediate mixing chamber, together with controlled communication between the inlets, the outlet and the mixing chamber.

The invention consists in certain novel combinations and arrangements of parts involving these designated features as will be more specifically set forth and claimed.

In the accompanying drawings I have illustrated one complete example of the physical embodiment of my invention wherein the parts are combined and arranged in accord with a satisfactory mode that has been devised for the practical application of the principles of the invention, but it will be understood that changes and alterations may be made in these exemplifying drawings and mechanical structures. Such changes and alterations are indicated in a modified disclosure of the invention in the accompanying drawings, which changes and alterations also come within the scope of my appended claims.

Figure 1 is a vertical longitudinal sectional view of a faucet embodying my invention, as at line B—B of Fig. 2.

Figure 2 is a horizontal longitudinal sectional view of the faucet as at line A—A of Fig. 1.

Figure 3 is a top plan view of the handle, detached, for operating the oscillatable mixing valve device.

Figure 4 is an end view as seen from the left in Fig. 1 showing the plurality of inlets to the faucet.

Figure 5 is a vertical longitudinal sectional view of a modified form of faucet embodying the invention, as at line 5—5 of Fig. 6.

Figure 6 is a horizontal longitudinal sectional view of the faucet of Fig. 5, as at line 6—6.

Figure 7 is an end view as seen from the left in Fig. 5 showing the hot and cold water inlets to the valve casing.

In both forms of the invention disclosed in the drawings the casing which encloses the operating parts is provided with a rear extension forming a cold water chamber 1 and a hot water inlet chamber 2, divided and separated by an interior vertical wall of partition 3, and this rear extension is fashioned with threaded nipples 4 and 5 for the attachment of cold and hot water supply pipes respectively.

These inlet chambers communicate through inlet ports 6 and 7 with a circular mixing chamber that is formed within the body 8 of the casing by an integral arcuate wall or partition 8', and the bottom of the circular mixing chamber is closed by means of a threaded circular plate 9 that forms part of the bottom wall of the casing.

The integral outlet nozzle 10 of the faucet is alined with the center of the mixing chamber and the partition 3 separating the inlet chambers, and it is located above the horizontal plane of the mixing chamber and in communication therewith through a horizontal annular seat or port 11 opening into the chamber.

Within the circular mixing chamber a distributing vane or gate-valve is swiveled and adjustable to control and to regulate the passage of hot and cold water through the mixing chamber to the outlet port 11. In Fig. 2 the gate or valve is shown in full lines to permit flow of both hot and cold water through the mixing chamber to the outlet port 11; and by dotted lines the gate is shown in position to shut off the hot water supply and permit flow of cold water to the outlet port.

In Fig. 6 the gate is shown in full lines to permit mixing of the hot and cold water supplies, and in dotted lines the gate is in position to cut off the cold water supply and permit free flow of the hot water supply to the outlet valve 11.

The gate valve or regulating vane is designated as a whole by the number 12 and it is provided with a central swivel pin 13 having its protruding ends journaled in sockets bored or drilled in the inner upper face of the plate 9 and the flat face of the wall over the mixing chamber.

One end of the swiveled gate is fashioned with a forked bearing 15 with which an operating pin 16 co-acts to swing the gate to the three adjustments with relation to the outlet port 11 above described.

In Figs. 1 and 2 the operating pin 16 is rigidly mounted in and projects downwardly from the tapered head-section 14 of a combined reciprocable and rotatable plug valve for the outlet port 11, which valve as a whole or unit is supported in a cylindrical head 17 rising vertically from the upper part of the body 8 of the casing.

The stem 18 of the head section 14 passes upwardly through a non-rotary, but vertically reciprocable section 19' of the valve, and an operating handle 19 having a perforated head or disk is fastened, as by screw 20 upon the upper reduced and protruding end of the valve stem. From this description it will be apparent that by turning the handle 19, which has a bearing on the upper flat face of the valve section 19', the stem 18, valve head 14, and pin 16 may be turned to adjust the oscillatable or swiveled gate valve or regulating vane 12 for controlling the flow of water through the mixing chamber.

The sectional valve 14—19' as a unit is reciprocable for opening and closing the outlet port 11 that is located intermediate the mixing chamber and the outlet nozzle of the faucet; the valve head 14 is both rotatable and reciprocable, while the valve-section 19' is non-rotary but reciprocable.

The outlet valve for controlling the volume of water passing through the port 11 is mounted in a bushing 21 which is externally threaded and secured in the internally threaded casing head 17, and the bushing is provided with a guide pin 22 projecting radially toward the axis of the plug valve into a guide groove 23 in the exterior surface of the reciprocable section 19' of the plug valve.

A clamp nut 24, which is internally threaded, is screwed down on the exteriorly threaded part of the bushing 21, and this nut is flanged to retain a flanged internally threaded sleeve 25 which meshes with the external threads on the upper end of the plug-section 19'.

A valve control handle 26, having an open-head or ring 27 and an attaching lug 28, is mounted on the clamp nut 24, with the lug engaged in a slot or groove cut through the exterior threads of the sleeve 25, as indicated in Fig. 3.

By turning the handle 26, together with the internally threaded sleeve 25, the threaded section 19 of the plug valve may be reciprocated, and as the head section 14 of the plug moves with section 19', the port 11 may be opened and closed to control flow of water through the port 11.

In the form of the invention disclosed in Figs. 5 and 6 the position of the gate valve or regulating vane is reversed from that of Figs. 1 and 2, and the swiveled gate is adjusted by means separate from and independent of the means for controlling the outlet valve.

In Figs. 5 and 6 the operating pin 16 is mounted on a circular head or disk 30 which is rigid with a stem 31 that is journaled in a bore of a cylindrical head 32 of the casing body, and a handle 33 is mounted on the upper protruding end of the stem for use in swinging the pin to regulate and control the gate or vane 12.

In Fig. 5 the outlet port 11 between the mixing chamber and the dispensing nozzle is controlled and regulated by means of a rotary and reciprocable valve 34, the screw stem or threaded stem 35 being provided with a rigidly fixed handle 35', for lifting and for depressing the valve 34 with relation to its seat or port 11.

A bonnet 37 is threaded on the externally threaded integral bushing 38 of the casing to co-act with the threaded valve stem and to retain the valve unit in working condition.

While I have shown the faucet in horizontal position for attachment to the hot and cold water supply pipes, it will be understood that the device as a whole may be installed in vertical position; and while the water inlet chambers are shown alined with the longitudinal axis of the device, these chambers, with their nipples, may be located laterally of the longitudinal axis of the valve casing in adapting the device to a variety of installations.

In both forms of the invention shown in the drawings the gate valve is adapted for adjustment to divide the mixing chamber into two conduits, one leading directly from the cold water inlet port to the outlet port, and the other leading from the hot water inlet port to the outlet port, and the flow of hot and cold water may be regulated to vary the temperature of the mixture admitted to the outlet port 11.

In Figs. 2 and 6, in full lines, the swiveled gate divides the mixing chamber, evenly, into two conduits supplying an equal volume of hot and cold water to the divided bottom opening of the outlet port 11. The degree of temperature may be regulated by moving the gate valve across the lower opening of the port to partially reduce the area of the port at the cold water side of the gate, and increase the area of the port at the hot water side; or the temperature may be regulated by moving the gate across the lower opening of the port to partially increase the area of the port at the cold water side and decrease the area of the port at the hot water side.

For a cold water supply to the port 11, as indicated by dotted lines in Fig. 2, the gate is swiveled entirely across the bottom opening of the port to close the hot water supply and completely open the cold water conduit between port 6 and port 11. For a hot water supply to the port 11, as indicated by dotted lines in Fig. 6, the gate is swiveled across the bottom opening of the port 11 to close the cold water supply, and to open the conduit between ports 7 and 11.

Having thus fully described my invention, what I claim as new and desire to secure by Letters Patent is:

1. A faucet having a mixing chamber provided with separate inlet ports, a valve chamber having an inlet port communicating with the mixing chamber, an upwardly facing valve seat in surrounding relation to said last port, an outlet nozzle communicating with the valve chamber above said inlet port for the valve chamber, a gate valve rotatable within the mixing chamber for controlling the admission of liquid thereto through the inlet ports for the mixing chamber, a valve mounted in the valve chamber and contacting said valve seat when in closed position, means establishing an operative connection between the valves comprising a pin carried by one and engaging a slot in the other, means by which the said second valve may be turned while seated to effect adjustment of said first valve, means by which said second valve may be moved into opened position to establish communication between the mixing chamber and the nozzle, an internally threaded sleeve carried by said faucet and said second valve having operative threaded connection with said sleeve so that a handle carried by said sleeve can be moved to operate said second valve to place either of said inlet ports into communicating relation with said mixing chamber.

2. A faucet as in claim 1 wherein a stem is provided on said second valve and a handle is provided on said stem to move said second valve into open position with relation to said mixing chamber.

3. A faucet having a mixing chamber provided with separate inlet ports, a valve chamber having an inlet port communicating with the mixing chamber, an upwardly facing valve seat in surrounding relation to said last port, an outlet nozzle communicating with the valve chamber above said second inlet port, a gate valve rotatable within the mixing chamber for controlling the admission of liquid thereto through the inlet ports, a valve mounted in the valve chamber and contacting said valve seat when in closed position, means establishing an operative connection between the valves comprising a pin carried by one and engaging a slot in the other, means by which the second valve may be turned while seated to effect adjustment of said first valve, means by which said second valve may be moved into open position for establishing communication between the mixing chamber and the nozzle, a handle attached to said second means for operating said second means for the operation of said first valve, and a second handle connected to said last means whereby said last valve may be operated.

JAY L. SAULSBERRY.

REFERENCES CITED

The following references are of record in the file of this patent:

UNITED STATES PATENTS

| Number | Name | Date |
|---|---|---|
| 938,868 | Hunter | Nov. 2, 1909 |
| 1,097,433 | Hill | May 19, 1914 |
| 2,017,864 | Lundegard | Oct. 22, 1935 |
| 2,029,232 | Green | Jan. 28, 1936 |
| 2,083,360 | Brinkman | June 8, 1937 |
| 2,110,952 | Glenn | Mar. 15, 1938 |